(12) United States Patent
Vasavada et al.

(10) Patent No.: US 9,578,646 B2
(45) Date of Patent: Feb. 21, 2017

(54) INTERFERENCE COMPENSATION IN UPLINK POWER CONTROL

(71) Applicant: Hughes Network Systems, LLC, Germantown, MD (US)

(72) Inventors: Yash Vasavada, Gaithersburg, MD (US); Yezdi Antia, North Potomac, MD (US); David Alan Roos, Boyds, MD (US); Ying Liu, Clarksburg, MD (US); Walter Robert Kepley, III, Gaithersburg, MD (US)

(73) Assignee: Hughes Networks Systems, LLC, Germantown, MD (US)

( * ) Notice: Subject to any disclaimer, the term of this patent is extended or adjusted under 35 U.S.C. 154(b) by 119 days.

(21) Appl. No.: 14/681,470

(22) Filed: Apr. 8, 2015

(65) Prior Publication Data
US 2016/0302207 A1    Oct. 13, 2016

(51) Int. Cl.
*H04W 72/08* (2009.01)
*H04W 72/04* (2009.01)
*H04B 7/185* (2006.01)
*H04W 52/24* (2009.01)

(52) U.S. Cl.
CPC ....... *H04W 72/082* (2013.01); *H04B 7/18513* (2013.01); *H04W 52/241* (2013.01); *H04W 52/243* (2013.01); *H04W 72/0453* (2013.01); *H04W 72/0473* (2013.01)

(58) Field of Classification Search
CPC .............................. H04B 7/18513; H04L 12/26
See application file for complete search history.

(56) References Cited

U.S. PATENT DOCUMENTS

| | | | |
|---|---|---|---|
| 2009/0117854 A1 | 5/2009 | Davis et al. | |
| 2009/0190491 A1* | 7/2009 | Miller | H04B 7/18513 370/252 |
| 2011/0007647 A1 | 1/2011 | Miller et al. | |

FOREIGN PATENT DOCUMENTS

EP    0805568 A1    11/1997

OTHER PUBLICATIONS

Communication relating to the results of the partial International Search in corresponding PCT Application No. PCT/US2016/026521, Jul. 27, 2016.

\* cited by examiner

*Primary Examiner* — Andrew Lai
*Assistant Examiner* — Leon Andrews
(74) *Attorney, Agent, or Firm* — Edell, Shapiro & Finnan LLC; Richard C. Irving

(57) ABSTRACT

A method and a satellite terminal are provided. The satellite terminal may range over multiple frequencies and may receive, from a satellite gateway, a signal quality indicator with respect to each of the ranged multiple frequencies. Noise and interference for a corresponding frequency are estimated based on at least one of the received signal quality indicators for the corresponding frequency. Path loss is estimated based on multiple received signal quality indicators, each of which is received in response to the satellite terminal transmitting a signal while not performing the ranging process. A transmit power level of the satellite terminal is adjusted for the corresponding frequency based on the estimated path loss and the estimated noise and interference for the corresponding frequency.

18 Claims, 9 Drawing Sheets

INTERFERENCE COMPENSATION IN UPLINK POWER CONTROL

FIELD OF THE INVENTION

The invention relates to a method and a Ka band communication satellite system for compensating for an effect of co-channel and co/cross-polarization interference on satellite feeder and service links. More particularly, the invention relates to a method and a Ka band satellite communication system for simultaneous compensation of frequency flat and fast varying channel variations as well as frequency sensitive channel variations that vary slowly (i.e., are nearly static) over time.

BACKGROUND

In certain Ka band satellite communication systems, satellite gateway outroute transmissions intended for one or more satellite terminals can interfere with inroute transmissions from satellite terminals to a satellite gateway. The inroute transmissions are affected by thermal noise effects with a spectral density of $N_0$ Watts/Hz. The presence of outroute interference results in an increase in the spectral floor due to the undesired effects from $N_o$ to $N_o+I_o$ (where $I_o$ refers to spectral density, or level, of outroute induced interference). The level, $I_o$, of the interference can vary with varying center frequencies and bandwidths of the outroute signals (i.e., the interference floor $I_o$ as a function of the frequency can be uneven). Inroutes on certain transmission frequencies experience more interference compared to inroutes on some other transmission frequencies.

In certain existing satellite communication systems, spectral density, or level, of noise plus interference $N_o+I_o$ is assumed to be identical across all frequencies. During initial installation and commissioning, the satellite terminal performs a procedure, subsequently referred to as a ranging procedure, to account for the $N_o+I_o$ level, in addition to a nominal value of end-to-end channel gain. The satellite terminal transmits the ranging signal at one frequency. Based on a received power level $P_{RX}$, of the ranged frequency received at the satellite gateway, the satellite terminal determines a nominal transmit power level (the ranging power setting). The certain existing satellite communication systems assume that the spectral density, $N_o+I_o$, is flat across all inroute frequencies. As a result, the nominal transmit power level estimated at the ranging frequency is used with respect to other inroute frequencies.

During the ranging process, the satellite terminal transmits a ranging signal at a maximum power level. The satellite gateway receiver measures a signal quality of the ranging signal and the satellite gateway transmits a message to the satellite terminal containing a measured Signal Quality Indicator (SQI). The SQI, as received by the terminal, typically exceeds a Signal Quality Target (SQT). The satellite terminal subsequently reduces transmit power and retransmits the ranging signal. The ranging process is repeated until the SQI received by the terminal from the satellite gateway approximately equals the SQT. When this occurs, the ranging process is declared to have been converged, and the terminal stores the final transmitted power upon the convergence of the ranging power. When the ranging process is performed during a clear sky condition, the ranging power value is determined by a clear sky path loss, satellite and ground equipment hardware gains, and the noise and interference $N_0+I_0$ spectral density.

Subsequent to ranging, when the satellite terminal initiates a transmission, the satellite terminal determines a power level with which to begin the transmission. The ranging power derived during an initial ranging process is a best estimate that the terminal has for the power level. The estimate is accurate during the clear sky condition and for an operating scenario in which the noise and interference $(N_0+I_0)$ floor, or level, is flat (i.e., it does not exhibit variations over different inroute frequencies). It is with assumptions as described above that, in an existing Ka band system, the ranging power value derived by the satellite terminal is used as a nominal transmit power whenever the satellite terminal initiates a return uplink transmission subsequent to the ranging process.

Similar to the ranging process, the satellite gateway continually measures the SQI for each uplink transmission from the satellite terminal and sends a message containing the SQI to the satellite terminal. The satellite terminal measures the difference between the SQT and the SQI received from the satellite gateway. The measured difference is a Power Control Error or PCE.

The PCE is used as an input to a system tracking filter (STF). An output of the STF is used to adjust the transmit power of the satellite terminal, relative to the initial transmit power, which is equal to the ranging power level. A positive-valued PCE, which occurs when SQT exceeds SQI, indicates that the satellite terminal is under-powered (i.e., it is transmitting at a less than desired power level). The positive-valued PCE causes the STF output to increase, which, in turn, increases the satellite terminal transmit power. The increased satellite terminal transmit power reduces a shortfall of the SQI relative to the SQT. Similarly, a negative-valued PCE results in the satellite terminal reducing the transmit power. Thus, in general, the PCE and the STF act to balance the satellite terminal transmit power, such that it is just enough to ensure that SQI approximately equals SQT. One single STF is used across all the inroute frequencies. This is because of the assumption, stated earlier, that the $N_0+I_0$ floor is flat. With this assumption, the main variable in an end-to-end link is Ka band channel gain, which can decrease from its value during the clear sky condition. The STF compensates for variation of the channel gain.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first aspect of the invention, a ranging process is performed to encompass multiple frequencies. As a result, a satellite terminal derives a multiplicity of ranging power settings, with each setting attuned to a corresponding frequency of the multiple frequencies. During the ranging process, channel gain variations typically do not change significantly across the multiple frequencies. Therefore, relative variations of the ranging power settings at multiple frequencies approximate variations in a noise and interference floor.

In a second aspect of the invention, satellite terminals may periodically (e.g., once a day or once a week, etc.) perform a multi-frequency ranging process and report to a satellite gateway observed variations in the ranging power settings, based on received corresponding SQIs from the satellite gateway for each of the multiple frequencies. The observed variations are estimates of noise and interference levels formed at a given terminal. The satellite gateway may average the reported variations from the satellite terminals and may broadcast averaged values of the reported variations. The satellite terminals may use the broadcasted averaged values of the reported variations to update their ranging power settings.

In a third aspect of the invention, a method is developed in which a satellite terminal continually tracks temporal variations in the noise and interference ($N_0+I_0$) floor. The tracking is performed by a filter, denoted as a Long Term Filter or LTF. Input of the LTF and its concept of operation are identical to that of the STF. A main difference between the STF and the LTF is that the LTF has a larger inertia compared to the STF. While the STF is designed to quickly respond to a fast changing variation in the end-to-end channel gain, the LTF is designed to track relatively slower variations in $N_0+I_0$ floor, and therefore, is designed to have a much slower response to varying stimuli. Output of the LTF, therefore, ideally reflects the temporal variations in $N_0+I_0$ floor. Furthermore, while the STF is not associated with a specific inroute frequency (the same STF is used for all the frequencies), the terminal has one LTF per each inroute frequency.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
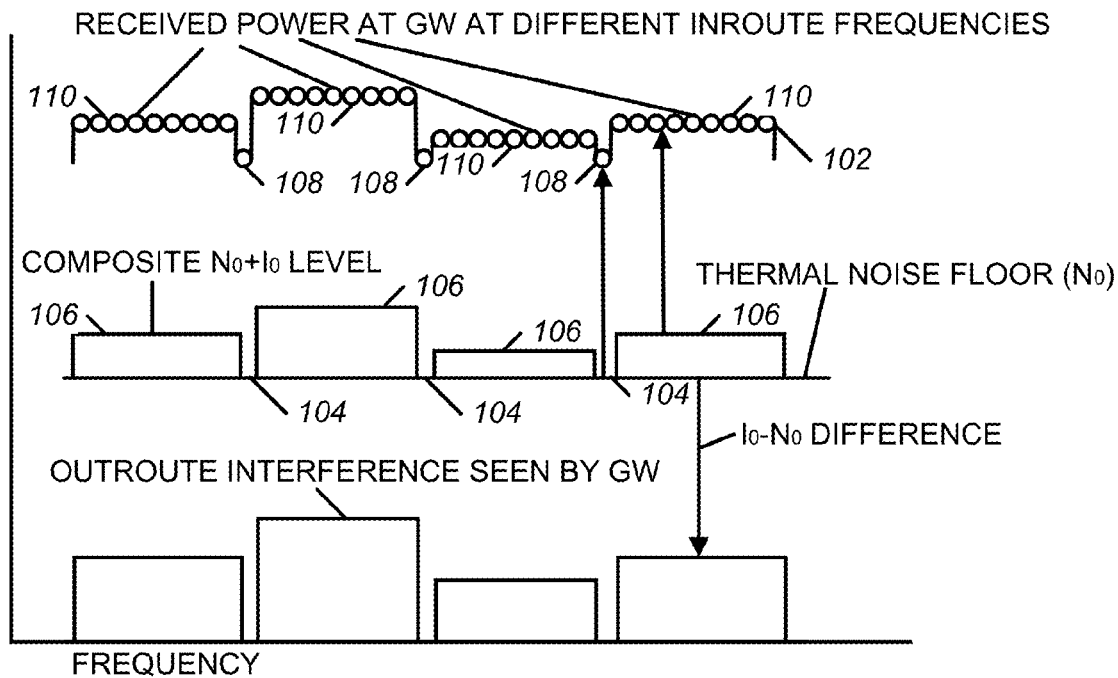
FIG. 1 illustrates noise and interference levels at various frequencies and their effect on power levels of signals received at a satellite gateway.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

A method and a Ka band satellite system are provided for compensating for inroute interference. More particularly, the invention relates to a method and a Ka band satellite communication system for simultaneous compensation of frequency flat and fast varying channel variations as well as frequency sensitive channel variations that vary slowly (nearly static) over time. A level of the nearly static frequency sensitive channel variations differs from one transmission frequency to another. The fast varying channel variations may arise, for example, because path loss variations at Ka band are rapid during rain events. Similarly, on each transmission frequency several co-channel interference sources and co/cross-polarization interference sources change quickly (they arise and subside as new terminals become active or currently active terminals become inactive).

When a satellite terminal of a Ka band satellite system is installed, ranging is performed over multiple frequencies. During the ranging, a signal is transmitted, initially, at a maximum power level on each of the multiple frequencies. When a satellite gateway receives the signal, the satellite gateway measures received signal quality and sends an indicator of the received signal quality, i.e., the signal quality indicator (SQI), to the satellite terminal on the outroute. The satellite terminal, upon receiving the SQI, compares the SQI against a signal quality target (SQT) and adjusts a transmission power level according to a difference between the SQI and the SQT. The satellite terminal retransmits the ranging signal after adjusting the transmission power. The process is repeated until the SQI converges to the SQT (i.e., is within a predefined tolerance of the SQT). When the SQI converges, the satellite terminal determines the ranged power setting at a respective frequency as a final value of the ranging power for the respective frequency. The ranging process is repeated on each inroute frequency. The satellite terminal derives a vector of ranged power setting values at completion of the multi-frequency ranging process. Each value in the vector corresponds to the ranged power setting at a respective particular inroute frequency.

The satellite terminal may perform the multi-frequency ranging process periodically, and send the measured vector of ranged power setting values to the satellite gateway. The satellite gateway may normalize the vector with respect to a reference inroute frequency. The normalized vector represents an estimate of noise and interference $N_0+I_0$ across different frequencies. In some embodiments, the satellite gateway averages multiple vectors received from different terminals and broadcasts the averaged normalized vector as an estimate of noise and interference $N_0+I_0$ on the outroute.

During transmissions subsequent to the initial ranging process, the satellite terminal, in various embodiments, continually updates a power control error or PCE, which is a difference between the SQT and the SQI. The PCE is passed through two filters. One filter is a system tracking filter or STF. The STF has a fast response and is intended to track fast changing interference variations (e.g., due to weather events) in channel gain. The second filter is called a long term filter or LTF. One LTF is maintained per each inroute frequency (i.e., the LTF is a bank of filters). The LTF may be initialized with an estimate of a noise and interference $N_0+I_0$ level broadcast by the satellite gateway on the outroute. Output of the LTF tracks the slow changing interference variations of the $N_0+I_0$ level per frequency.

Path Loss and Noise and Interference

A return link, or inroute $N_0+I_0$ level variation as a function of frequency is mainly due to interference caused by the satellite gateway's outroute transmission. A conceptual model shown FIG. 1 assumes that all the inroutes are at an identical (symbol, code) rate pair, i.e., they have the same Target $E_S/N_0$. A received power level 102 at the satellite gateway for the different inroutes, as a function of inroute frequency, varies in a manner identical to the $N_0+I_0$ floor variation 104, 106. Thus, valleys 104 and pedestals 106 in $N_0+I_0$ floor leads to valleys 108 and pedestals 110 in the power received at the satellite gateway for the different inroutes.

Figure 2:
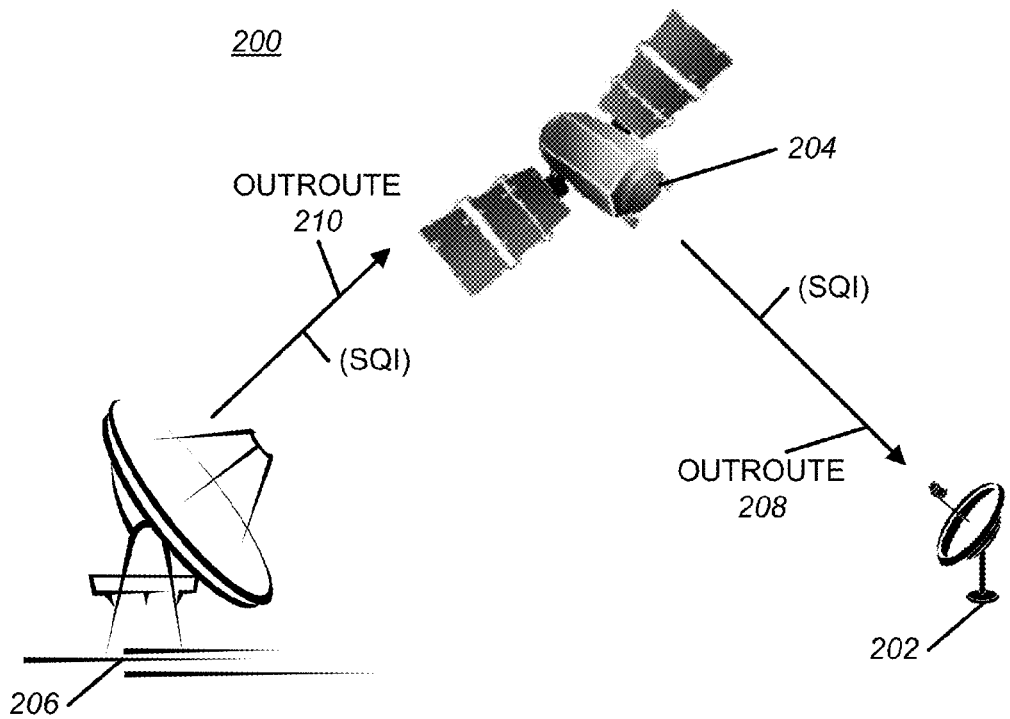
FIG. 2 illustrates an exemplary Ka band satellite communication system in which a satellite gateway transmits a SQI corresponding to a signal transmitted by a satellite terminal.

FIG. 2 illustrates an exemplary Ka band satellite communication system 200. System 200 may include a satellite terminal 202, a satellite 204, and a satellite gateway 206. For each received transmission from a respective sending satellite terminal 202, satellite gateway 206 measures signal quality and transmits a signal, including a SQI, to the respective sending satellite terminal 202. FIG. 2 shows satellite gateway 206 transmitting a signal, including the SQI, to satellite terminal 202 via outroute 210, satellite 204, and outroute 308 in response to satellite gateway 206 receiving a signal (not shown) from satellite terminal 202.

Satellite terminal 202 may transmit a signal at a power level of $P_{TX}$ to satellite gateway 206 via a first inroute (not shown) satellite 204, and a second inroute (not shown). The transmitted signal may experience path loss, or attenuation, before reaching satellite 204, and may experience path loss, or attenuation, when transmitted from satellite 204 to satellite gateway 206. Outroute transmissions from satellite gateway 206 to satellite terminal(s) 202 may cause interference with respect to inroute transmissions from one or more satellite terminals 202. Random additive noise, $N_0$, may also cause a loss of signal strength with respect to transmissions from one or more satellite terminals.

Figure 3:
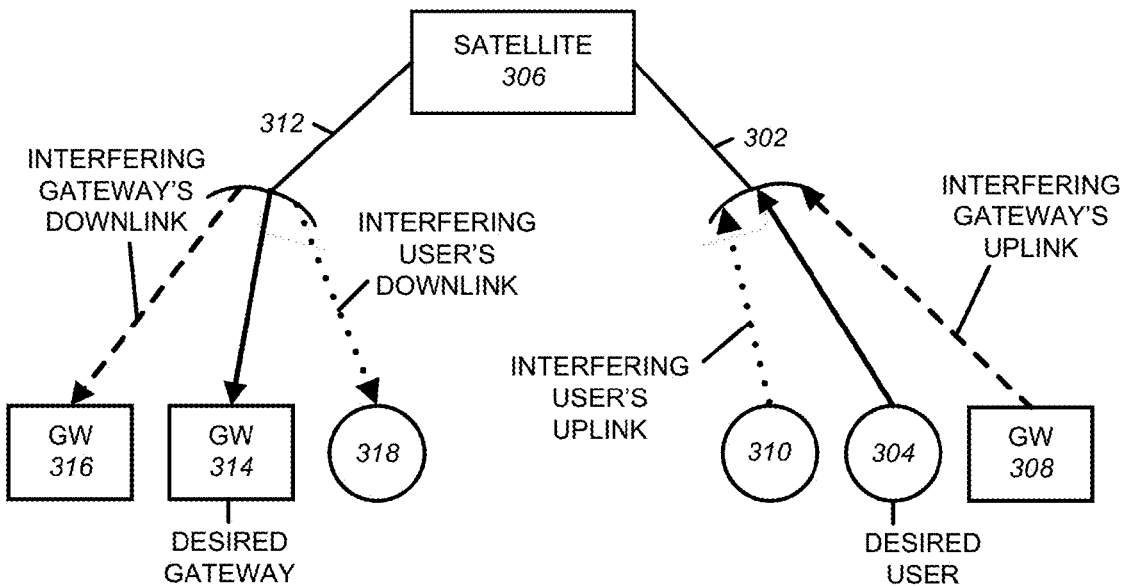
FIGS. 3 and 4 illustrate exemplary Ka band satellite communication systems showing sources of interference.

FIG. 3 shows sources of interference affecting a satellite terminal's inroute transmission. On a return uplink 302 from a satellite terminal 304 to a satellite 306, satellite terminal's inroute transmission 302 (as received at the satellite receive spatial beamformer) is interfered with by [co-channel, co-pol] transmissions from one or more other satellite gateways 308 and satellite terminals 310. The interference is mitigated by the spatial beamformer. Gain at the satellite receive spatial beamformer with respect to locations of interfering satellite gateway(s) 308 and satellite terminal(s) 310 is lower compared to gain at a location of satellite terminal 304. For example, gain from a return uplink from interfering satellite terminal(s) 310 and from a return uplink from interfering satellite gateway(s) 308 can be 10 dB weaker than the gain from the return uplink from desired satellite terminal 304.

On a return downlink 312 from satellite 306 to satellite gateway 314, an inroute transmission from satellite terminal 304 (as transmitted by the satellite transmit beamformer) is interfered with by [co-channel, co-pol] transmission to one or more other satellite gateways 316 and one or more other satellite terminals 318. The beam over a targeted location of satellite gateway 314 has a higher gain compared to side lobes of satellite transmit beams towards interfering satellite gateway(s) 316 and interfering satellite terminal(s) 318. For example, a return downlink to interfering gateway(s) 316 can be 10 dB weaker than the return downlink to desired satellite gateway 314. The difference in gain helps mitigate the co-channel interference (CCI).

Thus, there are three sources of interference for a return link inroute transmission from a satellite terminal: (i) outroute transmissions by different co-channel, co-pol satellite gateways, (ii) inroute transmissions from other co-channel, co-pol satellite terminals, and (iii) transmissions from neighboring satellite systems.

Figure 4:
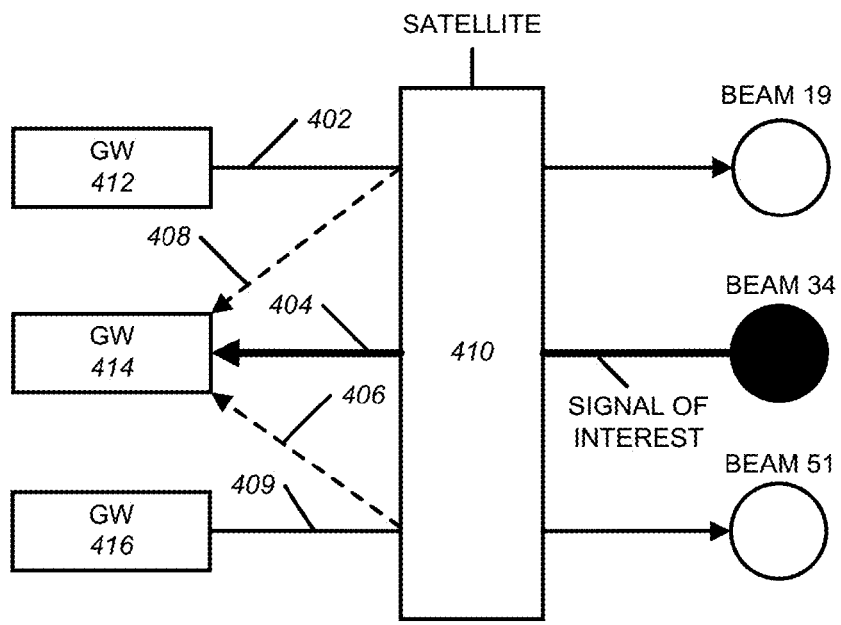

FIG. 4 illustrates a special case of the more general interference characterization shown in FIG. 3. Suppose the spectral densities of thermal noise and outroute interference in dBW/Hz are denoted, respectively, as $N_0^{dBW}$ and $I_0^{dBW}$. As shown in FIG. 1, $I_0^{dBW}$ is typically several decibels below $N_0^{dBW}$. However, unless $I_0^{dBW}$ is significantly suppressed relative to $N_0^{dBW}$, the composite $N_0^{dBW}+I_0^{dBW}$ rises over the thermal noise floor. This Rise Over Thermal (ROT) creates hills, shown in FIG. 1, wherever the outroute interference is present.

As shown in FIG. 4, satellite gateway 412 transmits on outroute 402 to satellite 410, which transmits to a satellite terminal in beam 19. Beam 34 of satellite 410 receives a signal of interest from a satellite terminal and transmits the signal of interest on a return downlink 404 to satellite gateway 414. Satellite gateway 416 transmits a signal on outroute 409 to satellite 410, which transmits the signal to a satellite terminal in beam 51. The signal of interest transmitted on a return downlink 404 from satellite 410 to satellite gateway 414 experiences interference 408, 406 from outroutes 402 and 409, respectively.

Uplink Power Control

A method is described for estimating a differential Interference and Noise (I+N) floor, which is defined as follows:

$$\Delta_{I+N}(f) = E[P_{I+N}(f) - P_{I+N}(f_{ref})] \qquad \text{Eq. 1}$$

where E[ ] is an expected value or average.

Uplink Power Control (ULPC) transmit power, $P_{ULPC}$ (s, c, f, k), at (symbol rate s, code rate c, frequency f, frame number k) is as follows:

$$P_{ULPC}(s, c, f, k) = \left[\frac{C}{N_0}(s, c, f, k)\right]_{IR}^{RX} + P_{I+N}(f, k) - G(f, k) \text{dB} \qquad \text{Eq. 2}$$

Here, $$\left[\frac{C}{N_0}(s, c, f, k)\right]_{IR}^{RX}$$

is a received inroute carrier to noise ratio ($C/N_0$) at the satellite gateway. The terms $P_{I+N}(f, k)$ and $G(f, k)$ denote the I+N floor and a return link gain G, respectively, which are taken as functions only of (frequency, frame number), and not of (s, c).

From Eq. 2, a noise and interference floor at (frequency=f, frame number=k) is as follows.

$$P_{I+N}(f, k) = P_{ULPC}(s, c, f, k) + G(f, k) - \left[\frac{C}{N_0}(s, c, f, k)\right]_{IR}^{RX} \qquad \text{Eq. 3}$$

A satellite terminal knows $$\left[\frac{C}{N_0}(s,c,f,k)\right]_{IR}^{RX}$$

(from a satellite gateway forward link message).
Alternatively, to avoid a measurement error in estimation of $$\left[\frac{C}{N_0}(s,c,f,k)\right]_{IR}^{RX},$$

this variable can be taken as equal to a target $C/N_0$, i.e., $$\left[\frac{C}{N_0}(s,c,f,k)\right]_{IR}^{Target}.$$

An underlying assumption is that the ULPC is in a converged state and that power control error (PCE) is only due to zero mean statistical deviations, including but not limited to Signal to Interference plus Noise Ratio (SINR) estimation error at the satellite gateway's inroute IR receiver, and an error in calibration of a power curve transfer function used at the satellite terminal.

Does not have a measurement of $P_{ULPC}$ (s, c, f, k).
Does not have a direct measurement of uplink [frequency, frame number] dependent gain term G(f, k).

Long-Term Averaging of Power Control Error

In a method of uplink power control, transmit power $P_{ULPC}$ (s, c, f, k) is written as follows:

$$P_{ULPC}(s,c,f,k) = h\left[P_{STF}(s,c,f,k) + P_{ULFE}(s,c,f,k) + \Delta\left[\frac{C}{N_0}(s,c)\right]_R^T + P_{PLPC}^R(s,c)\right] \quad \text{Eq. 4}$$

Here, $$\Delta\left[\frac{C}{N_0}(s,c)\right]_R^T = \left(\frac{c}{N_0}\right)_T^{IR} - \left(\frac{c}{N_0}\right)_R^{IR}$$

is a difference between Target $C/N_0$ during ranging and an actual $C/N_0$ received at the satellite gateway during ranging, $P_{PLPC}^R$ (s, c) is the terminal transmit power determined during the ranging, $P_{STF}$ and $P_{ULFE}$ are the outputs of the STF and UpLink Fade Estimator (ULFE) filters, respectively, and h [°] represents a nonlinear function of the frequency (e.g., a Look-Up Table that converts the ULPC (STF+ULFE) output to a Power Control Word (PCW)), and an RF transmitter chain gain that converts the PCW to the satellite terminal's Equivalent Isotropically Radiated Power (EIRP).

Long-Term Averaging of the Applied ULPC Attenuation $P_{ULPC}(S)$ c, f, k) may be estimated by using applied ULPC attenuation.

$$P_{ULPC}(s,c,f,k) = P_{max} - \alpha_{ULPC}(s,c,f,k) \quad \text{Eq. 8}$$

Here, an exact value of a maximum satellite terminal transmit power $P_{max}$ is neither known nor required (the latter since $P_{max}$ is assumed to be independent of the frequency and thus, is canceled out in the calculation of $\Delta_{I+N}(f)$ in Eq. 1). The term $\alpha_{ULPC}$ (s, c, f, k) denotes attenuation relative to $P_{max}$ applied by the ULPC.

The following indicates the estimate of $P_{I+N}(f, k)$.

$$\hat{P}_{I+N}(f,k) = P_{ULPC}(s,c,f,k) + G(f,k) - \left[\frac{C}{N_0}(s,c,f,k)\right]_{IR}^{Target} =$$

$$P_{max} - \alpha_{ULPC}(s,c,f,k) + g' - \left[\frac{C}{N_0}(s,c,f,k)\right]_{IR}^{Target}$$

Thus, in this method, the unknown return gain term G(f, k) is replaced by a constant g' dB. A rationale behind this assumption is that the long-term averaging is used only in the clear-sky condition, during which G(f, k)≈g' dB.

Estimated $P_{I+N}(f, k)$ is averaged over time (multiple frames) to obtain an estimate of the interference plus noise floor $P_{I+N}$ (f) at frequency f; this averaging, or the Long Term Filtering (LTF), is performed only over those frames, say a total of $N_f$ frames, which are transmitted in the clear-sky conditions.

$$\hat{P}_{I+N}(f) = LTF_{clear-sky}\{\hat{P}_{I+N}(f,k)\} = LTF_{clear-sky}\{\alpha_{ULPC}^{adj}(s,c,f,k)\}$$

Here, $$\alpha_{ULPC}^{adj}(s,c,f,k) = -\alpha_{ULPC}(s,c,f,k) - \left[\frac{C}{N_0}(s,c,f,k)\right]_{IR}^{Target}.$$

The parameter of interest, $\Delta_{I+N}(f)$ in Eq. 1, is estimated as follows:

$$\hat{\Delta}_{I+N}(f) = \hat{P}_{I+N}(f) - \hat{P}_{I+N}(f_{ref})$$

Figure 5:
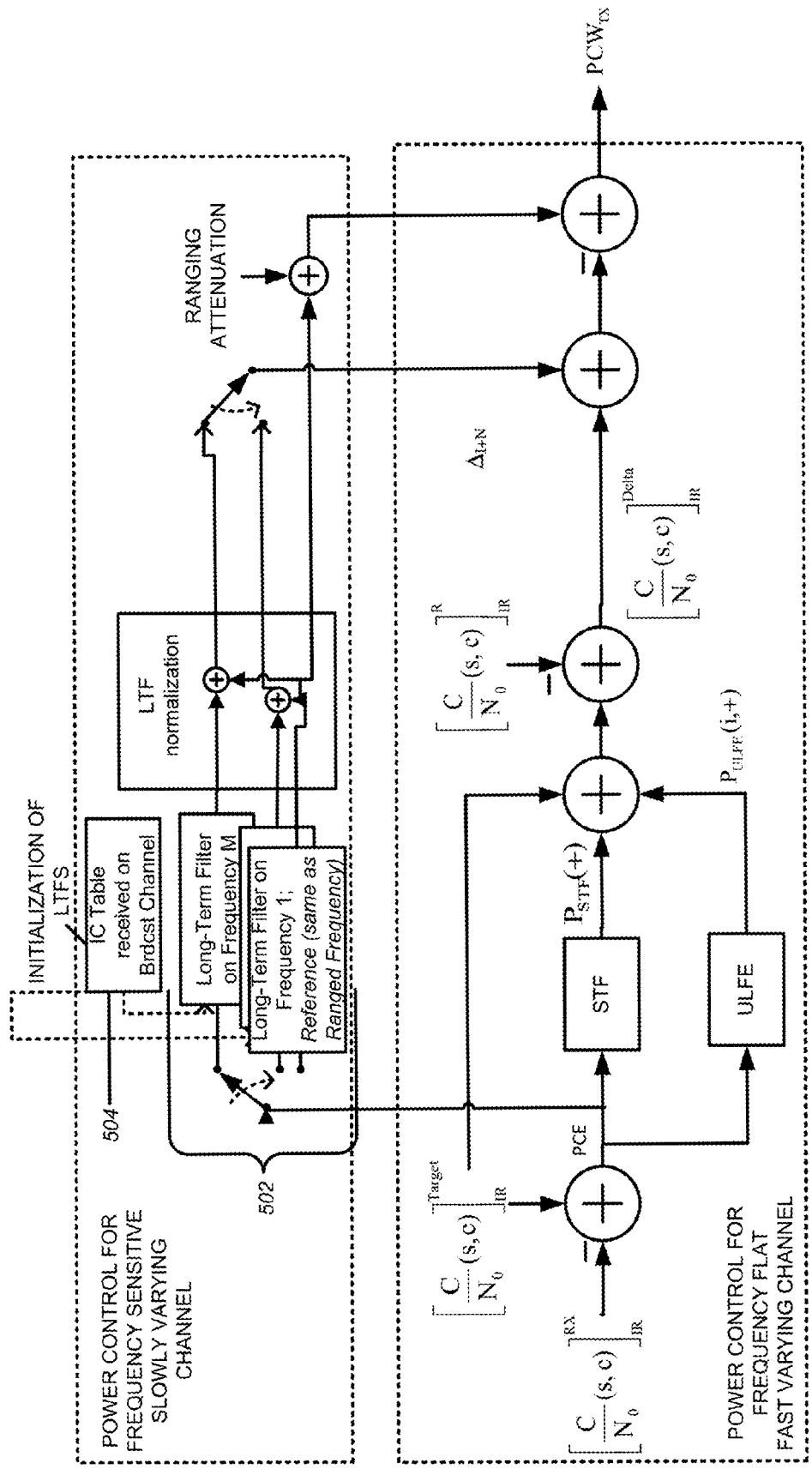
FIG. 5 is an exemplary design of uplink power control interference compensation for a satellite terminal.

FIG. 5 illustrates an exemplary design of uplink power control for an embodiment within a satellite terminal. For measurement of the estimated differential I+N floor levels, $\hat{\Delta}_{I+N}$ (f), for different inroute frequencies, the satellite terminal maintains a bank of Long Term Filters (LTFs) 502 (FIG. 5). Each LTF 502 corresponds to a different inroute frequency.

There is one LTF 502 for each inroute frequency starting from a low end of the available return link spectrum to an upper end of the spectrum. LTFs 502 may be initially assigned values from an Interference Compensation (IC) Table 504, which is received on a broadcast channel. Subsequent to a successful ALOHA attempt and after receiving an inroute channel assignment, the satellite terminal selects an LTF, corresponding to the assigned IR frequency, from LTFs 502 (from the bank of LTFs). The selected LTF may be fed, as an input, either the output of the STF, the power control error (PCE), or the commanded attenuation. FIG. 5 shows PCE as the input to LTFs 502.

At each power control loop update, an average of outputs of the selected LTF, relative to a reference LTF, is averaged with appropriate entries in broadcast channel Interference Compensation (IC) Table 504. The reference LTF corresponds to the ranged frequency, which is a unique frequency (i.e., the terminal performs single-rate ranging on only one inroute frequency). The output of the reference LTF is used to adapt the ranging attenuation setting. A sum total of the LTF output, the outputs of the STF and the ULFE filters and a negative of the continuously adapted (using the reference LTF output) ranging attenuation determines the transmit power setting. A periodic multi-frequency ranging process may be used in a variation of this method. In the variation, the multi-frequency ranging process may be performed every 24 hours or another suitable time period.

Ranging

When a satellite terminal is installed, a ranging process may be performed on multiple frequencies on which the satellite terminal may transmit. During the ranging process, satellite terminal 202 transmits an Aloha message on a ranged frequency, initially, at a maximum power level.

Figure 6:
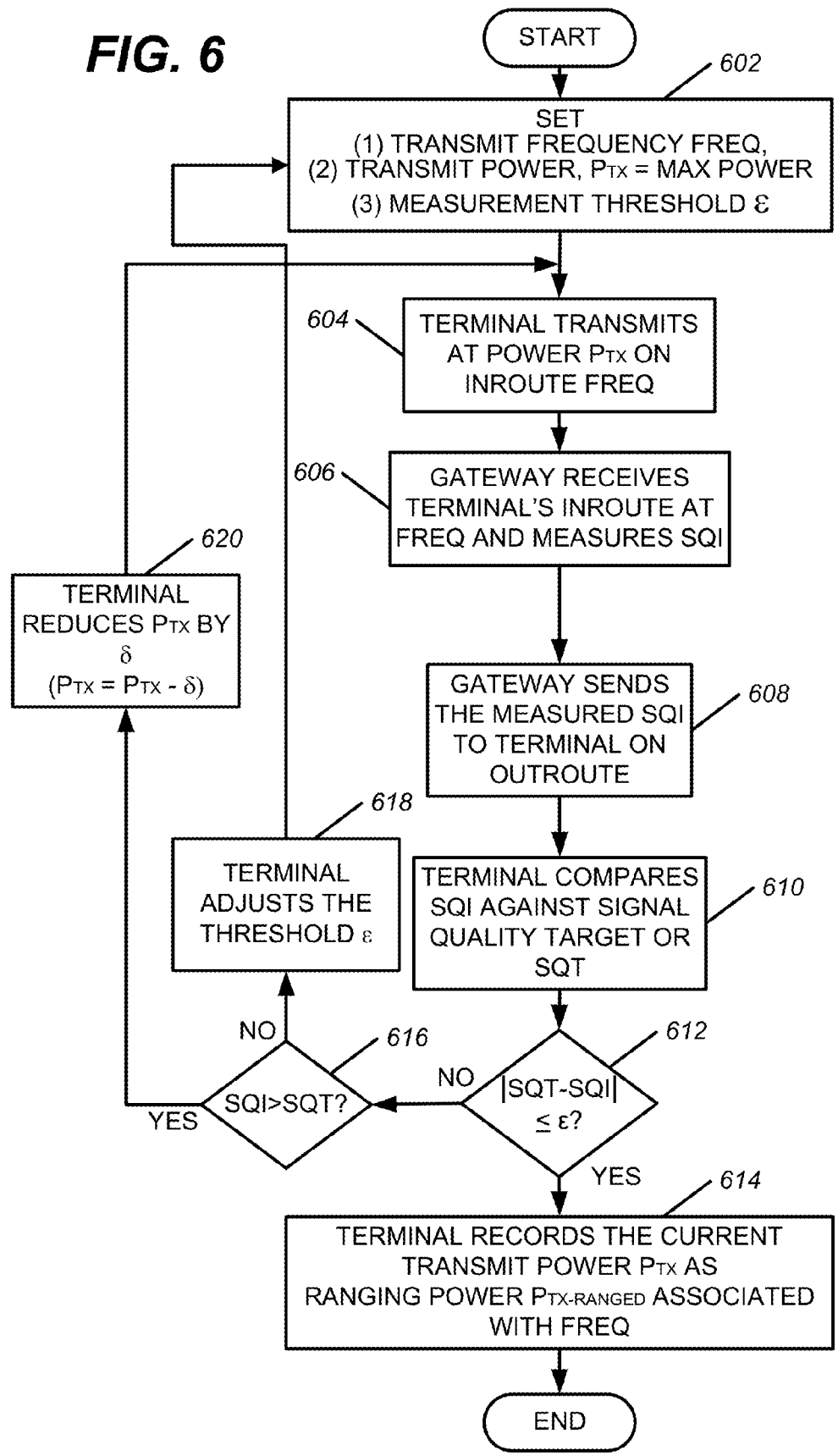
FIG. 6 is a flowchart of an exemplary process for a satellite terminal to perform a ranging process in an embodiment of the invention.

FIG. 6 is a flowchart illustrating an exemplary process in which a satellite terminal performs the ranging process. The process may begin with the satellite terminal setting a transmit frequency, freq, transmit power, $P_{TX}$, to maximum power, and a measurement threshold $\epsilon$ (act 602). The satellite terminal may then transmit on inroute frequency, freq, at transmit power, $P_{TX}$ (act 604). A satellite gateway may then receive the signal on the satellite terminal's inroute at frequency, freq, and may measure a signal quality indicator (SQI) of the received signal (act 606). The satellite gateway may then send a signal including the measured SQI to the satellite terminal on an outroute (act 608). The satellite terminal may receive the signal including the measured SQI and may compare the SQI with a signal quality target (SQT) (act 610). Satellite terminal 202 may then determine whether the measured SQI converged to within a predetermined value, $\epsilon$, of the SQT (i.e., |SQT−SQI|≤$\epsilon$) (act 612). If the satellite terminal determines that the SQI has converged to within $\epsilon$ of the SQT, then the satellite terminal may record a current value of the transmit power, $P_{TX}$, as a ranging power, $P_{TX-Ranged}$, associated with frequency, freq, (act 614) and the process may be completed.

If, during act 612, the satellite terminal determines that the SQI has not yet converged, then the satellite terminal may determine whether SQI is greater than SQT (act 616). If the satellite terminal determines that SQI is not greater than SQT, then satellite terminal 202 may adjust the measurement threshold $\epsilon$ (act 618). Acts 602-612 may then be repeated.

If, during act 616, the satellite terminal determines that SQI is greater than SQT, then the satellite terminal may reduce the transmit power, $P_{TX}$, by $\delta$ (act 620). Acts 604-612 may then be repeated.

Note that the measurement threshold $\epsilon$ and transmit power adjustment step size $\delta$ may be adjusted appropriately to ensure that the ranging process converges, i.e. |SQT−SQI|≤$\epsilon$, after several iterations of the feedback process shown in FIG. 6.

Figure 7:
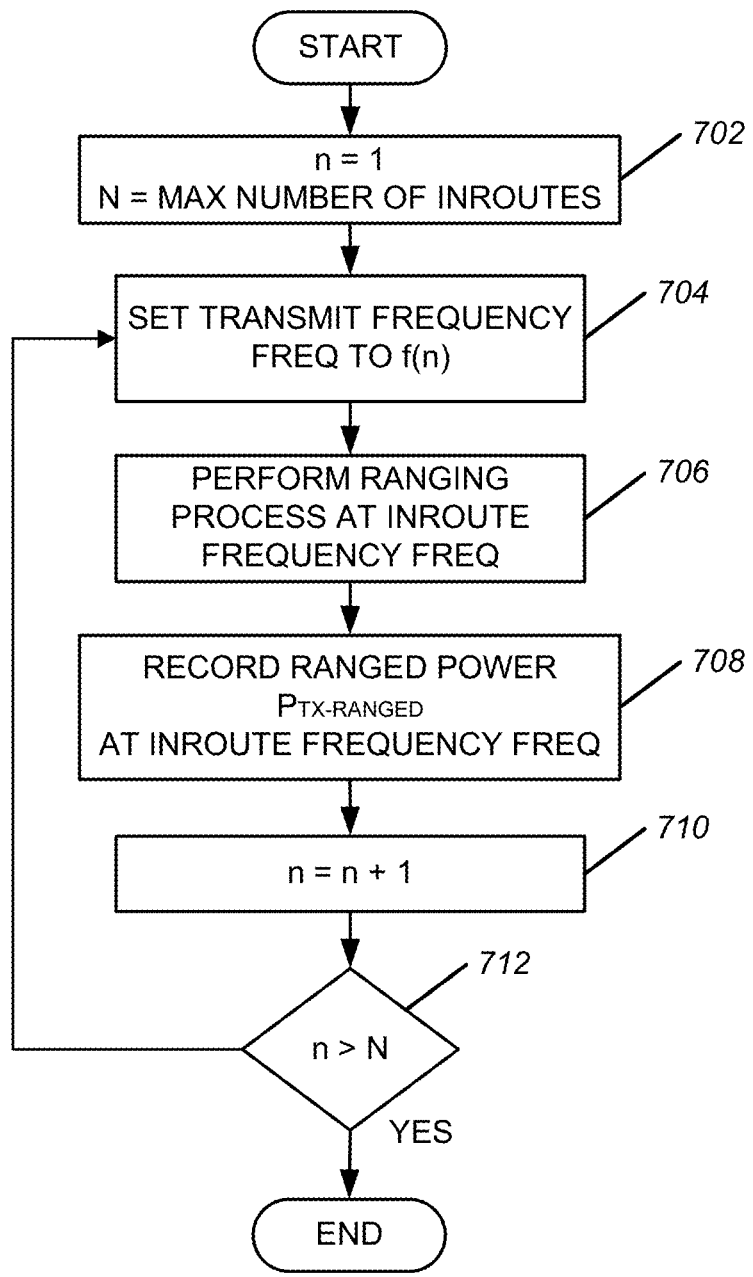
FIG. 7 is a flowchart illustrating an exemplary process that may be performed by a satellite terminal to perform a multi-frequency ranging process.

FIG. 7 is a flowchart illustrating an exemplary process that may be performed by satellite 202 when ranging over multiple frequencies. The process may begin with the satellite terminal initializing a variable, n, to 1 and initializing a variable, N, to a maximum number of inroutes (act 702). Satellite terminal 202 may then set a transmission frequency to f(n) (act 704). Next, the satellite terminal may perform the ranging the process, illustrated by the flowchart of FIG. 6, for the set transmission frequency (act 706). The ranged power, $P_{TX-RANGED}$, may then be recorded for the set transmission frequency (act 708). The variable, n, may then be incremented (act 710). The satellite terminal may then determine whether n is greater than N (act 712). If n is determined not to be greater than N, then the satellite terminal may repeat acts 704-712. Otherwise, the satellite terminal may complete the process.

Generation of Interference Compensation Table at Satellite Gateway

Figure 8:
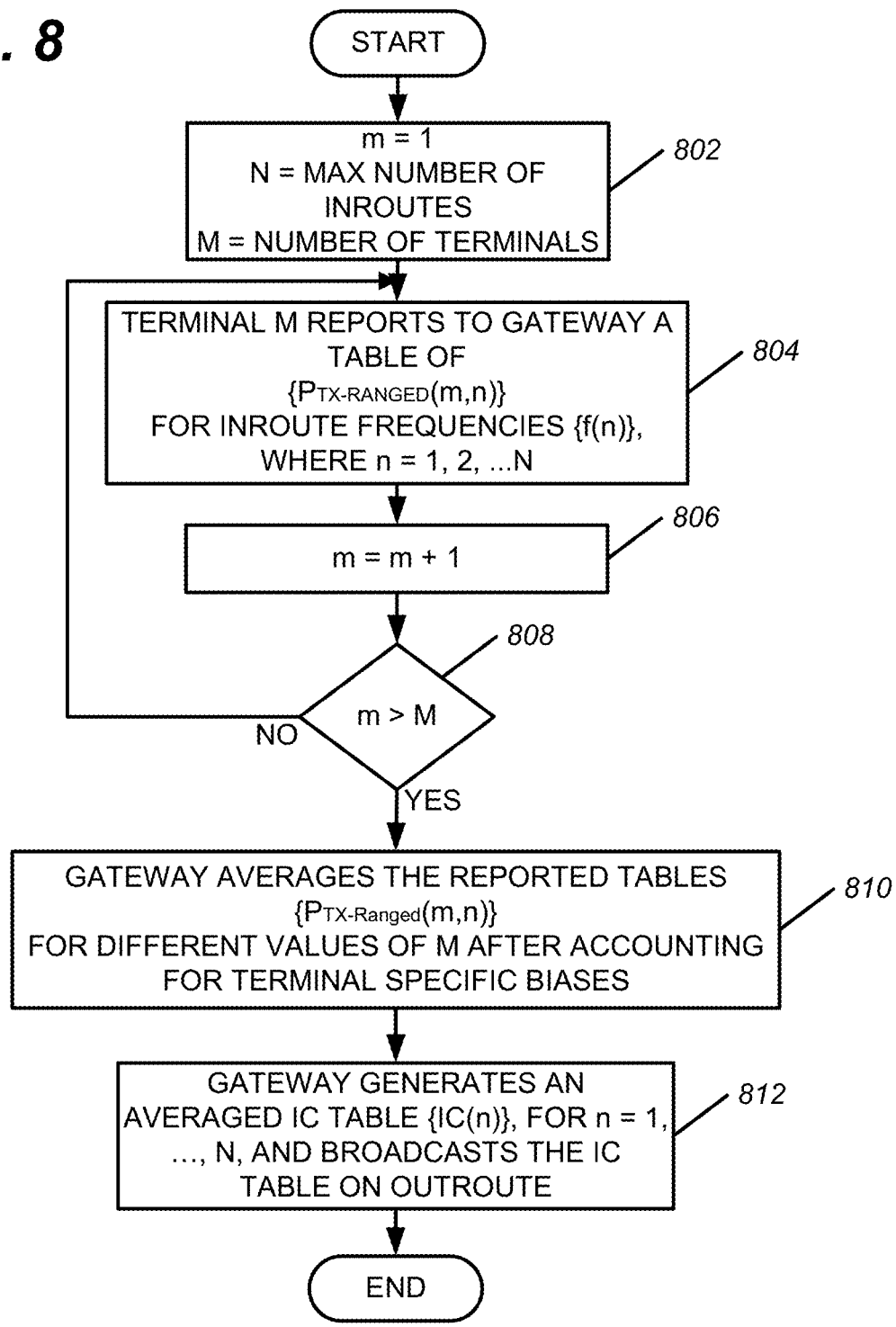
FIG. 8 is a flowchart illustrating an exemplary process for generating an interference compensation table for a satellite gateway.

FIG. 8 is a flowchart that illustrates an exemplary process for generation of an interference compensation (IC) table at the satellite gateway. The process may begin with the satellite gateway initializing variables m to 1, N to maximum number of inroutes, and M to number of terminals (act 802). After ranging over multiple frequencies, satellite terminal m reports to the satellite gateway a table of recorded ranged powers ($P_{TX-RANGED}$(m, n)) for all inroute frequencies f(n), where n=1, 2, . . . N (act 804). The satellite gateway may then increment the variable, m, (act 806) and may determine whether m is greater than M (act 808). If m is determined not to be greater than M, then the satellite gateway may repeat acts 804-808. Otherwise, the satellite gateway may average the reported IC tables ($P_{TX-RANGED}$(m, n)) from the reporting satellite terminals after accounting for terminal specific biases (act 810). The satellite gateway may then generate an averaged IC table (IC(n)), for n=1, . . . , N, and may broadcast the IC table to the reporting satellite terminals on an outroute (act 812). The process may then be completed.

Figure 9:
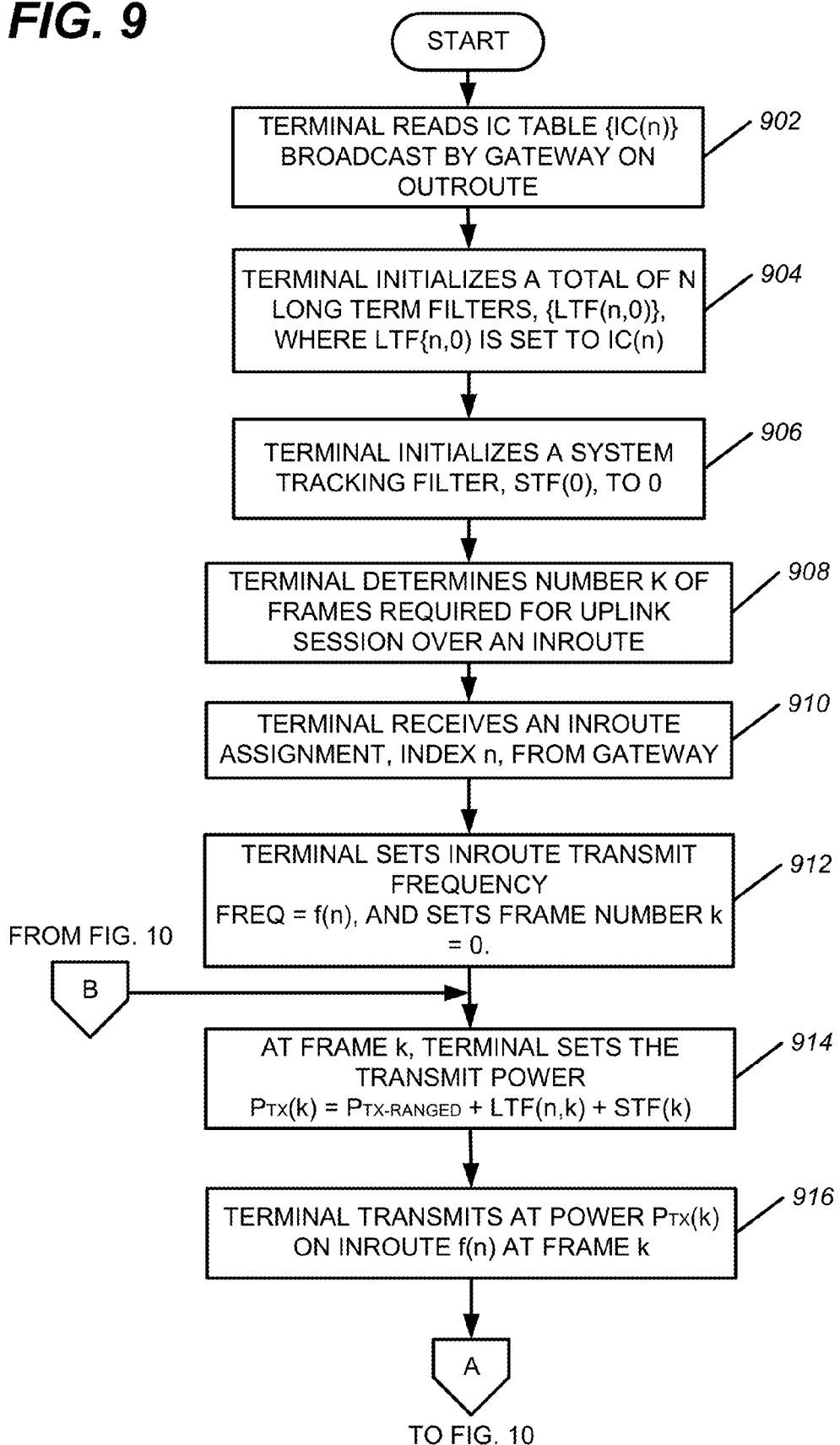
FIGS. 9 and 10 are flowcharts illustrating an exemplary process for a satellite terminal to continuously estimate interference compensation.
Figure 10:
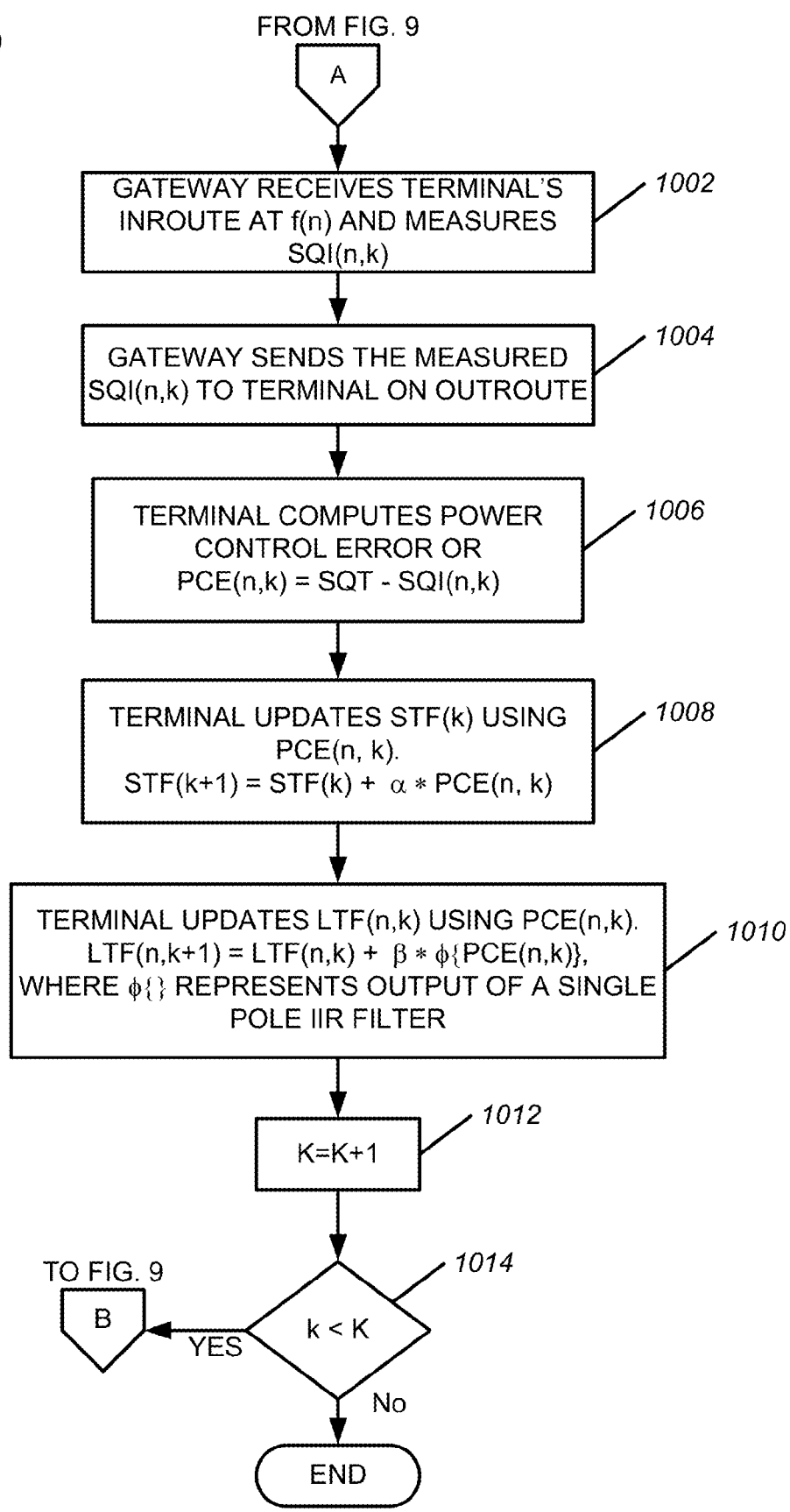

FIGS. 9 and 10 are flowcharts of an exemplary process for continuous interference compensation estimation at a satellite terminal using a bank of LTFs. The process may begin with the satellite terminal reading IC table (n), which is broadcast on an outroute by the satellite gateway (act 902). The satellite terminal may then initialize N LTFs, LTF(n,0), where LTF(n,0) is set to IC(n) (act 904). The satellite terminal may then initialize a system tracking filter, STF(0), to zero (act 906). The satellite terminal 202 then may determine a number, K, of frames required for an uplink session over an inroute (act 908). The satellite terminal then may receive an inroute assignment, index n, from the satellite gateway (act 910). The satellite terminal may then set transmit frequency, Freq, to f(n), and may set a frame number, k, to zero (act 912). At frame k, the satellite terminal may set the transmit power, $P_{TX}$(k), to $P_{TX-RANGED}$+LTF(n, k)+STF(k) (act 914). The satellite terminal may then transmit a signal at power $P_{TX}$(k) on inroute f(n) at frame k (act 916). The satellite gateway may then receive the transmitted signal from the satellite terminal on inroute f(n) and may measure SQI(n,k) (act 1002; FIG. 10). Satellite gateway 206 may then send the measured SQI(n,k) to the satellite terminal on the outroute (act 1004). The satellite terminal may then compute PCE, such that PCE(n,k)=SQT−SQI(n,k) (act 1006). The satellite terminal may then update STF(k) using PCE(n,k), such that STF(k+1)=STF(k)+α*PCE(n,k), where α is a time constant of a first order Infinite Impulse Response (IIR) filter, which is typically <<1 (act 1008). The satellite terminal may then update LTF(n,k) using PCE(n,k) such that LTF(n,k+1)=LTF(n,k)+β*φ{PCE(n, k)}, where φ{ } represents output of a single pole Infinite Impulse Response (IIR) filter (act 1010). The variable K may then be incremented (act 1012) and if k is determined to be less than K, then acts 914-1014 may again be performed. Otherwise, if k is determined not to be less than K, the process may then be completed.

Exemplary Satellite Terminal

Figure 11:
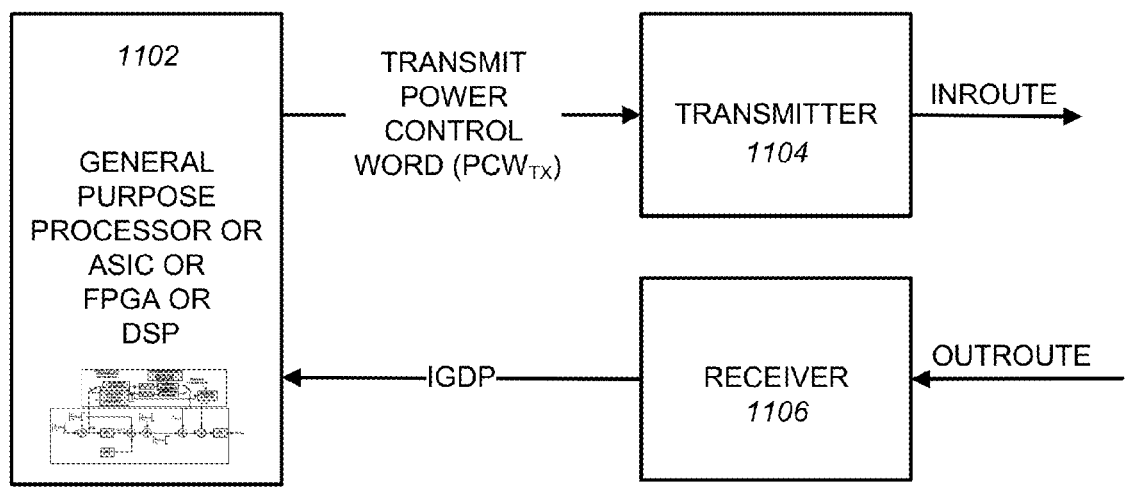
FIG. 11 illustrates an exemplary hardware configuration for an embodiment.

FIG. 11 shows a simplified block diagram of a satellite terminal, which may be used in various embodiments. The exemplary satellite terminal includes a transmitter 1104 (modulator+IF and RF radio), a receiver 1106 (RF/IF Radio+demodulator) and a processing element 1102, which may include at least one of a general purpose processor, an Application Specific Integrated Circuit (ASIC), a Digital Signal Processor (DSP) or a Field Programmable Gate Array (FPGA). The interference compensation and power control algorithms may be executed by processing element 1102. Information packets along with a transmit power control word ($PCW_{TX}$) and an inroute frequency (fn) may be sent by processing element 1102 via an interface to transmitter 1104. Receiver 1106 receives an outroute carrier signal on an outroute, demodulates the outroute carrier signal to recover information packets, and sends the information packets to processing element 1102 over an interface.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for use by a satellite terminal to compensate for noise and interference in a Kurz above Ka band satellite system, the method comprising:
   for each respective frequency of a plurality of frequencies, performing a ranging process comprising:
      transmitting a ranging signal over the respective frequency from the satellite terminal,
      receiving, at the satellite terminal from a satellite gateway, a respective signal quality indicator in response to the transmitting of the ranging signal over the respective frequency,
      adjusting a transmit power on the respective frequency at the satellite terminal based on a difference between the respective signal quality indicator and a signal quality target,
      repeating the transmitting of the ranging signal, the receiving of the respective signal quality indicator, and the adjusting of the transmit power until the difference between the received respective signal quality indicator and the signal quality target is within a predefined tolerance, and
      storing a value representing the adjusted transmission power as a ranged power setting at the respective frequency in a vector of ranged power settings for the plurality of frequencies when the difference between the received respective signal quality indicator and the signal quality target is within the predefined tolerance, wherein:
   estimated noise and interference levels for the plurality of frequencies are based on relative variations in the vector of the ranged power settings.

2. The method of claim 1, further comprising:
   sending, upon completion of the ranging process, the vector of ranged power settings for each of the plurality of frequencies to a satellite gateway;
   receiving an averaged normalized vector of ranged power settings, the averaged normalized vector being based on vectors of ranged power settings from a plurality of satellite terminals; and
   updating the vector of ranged power settings based on the received averaged and normalized vector of ranged power settings.

3. The method of claim 1, further comprising:
   using the difference between the received respective signal quality indicator and the signal quality target during subsequent transmissions by the satellite terminal to update a system tracking filter.

4. The method of claim 3, further comprising using the difference between the received respective signal quality indicator and the signal quality target during subsequent transmissions by the satellite terminal to update a long term filter only during a clear-sky condition.

5. The method of claim 4, further comprising maintaining, by the satellite terminal, a current clear sky condition by continually monitoring the received respective signal quality indicator.

6. The method of claim 3, further comprising using the system tracking filter, which is common across the plurality of frequencies, to track and compensate for fast changing variations in a channel gain.

7. The method of claim 1, wherein the transmitting of the ranging signal over the respective frequency from the satellite terminal further comprises transmitting an Aloha signal on the respective frequency initially at a maximum power level.

8. A system for use in a satellite terminal of a Kurz above Ka band satellite system, the system comprising:
   a transmitter for transmitting a signal via any one of a plurality of frequencies;
   a receiver for receiving a respective signal quality indicator from a satellite gateway, the respective signal quality indicator being received in response to the transmitter transmitting the signal via a respective frequency of the plurality of frequencies, wherein the system is configured to:
   estimate respective noise and interference for corresponding frequencies of the plurality of frequencies based, at least partially, on at least one received first signal quality indicator for each of the respective frequencies, the at least one received first signal quality indicator for each of the respective frequencies being received in response to the transmitter transmitting the signal on each of the corresponding frequencies during a ranging process, the estimated respective noise and interference changing relatively slowly with respect to an estimated path loss,
   estimate the path loss based, at least partially, on a plurality of second signal quality indicators received in response to the transmitter transmitting second signals while not performing the ranging process, the estimated path loss being arranged to change relatively quickly with respect to the estimated noise and interference for the corresponding frequencies, and
   adjust a transmit power level of the transmitter for the respective frequency of the plurality of frequencies based on the estimated path loss and the estimated noise and interference for the respective frequency.

9. The system of claim 8, wherein the system is further configured to estimate the respective noise and interference for each of the corresponding frequencies based on a received averaged normalized vector of ranged power settings, the averaged normalized vector of ranged power settings being based on sets of ranged power settings transmitted by a plurality of satellite terminals after performing respective ranging processes.

10. The system of claim 8, wherein the system is further configured to:
apply first values based on a difference between the respective signal quality indicator received during a ranging process and a signal quality target for each of the corresponding frequencies to a respective long term filter for each of the corresponding frequencies, the respective long term filter for each of the corresponding frequencies being arranged to produce the estimated respective noise and interference for the respective frequency of the corresponding frequencies; and
apply second values based on a difference between the respective signal quality indicator received after each subsequent transmission after the ranging process and a signal quality target to a system tracking filter that produces the estimated path loss, an output of the system tracking filter being more responsive to changes in the applied second values than an output of the respective long term filter for each of the corresponding frequencies is to changes in the applied first values.

11. The system of claim 8, wherein the system estimates the respective noise and interference for the corresponding frequencies of the plurality of frequencies based on only ones of the at least one first received signal quality indicator for each of the corresponding frequencies that correspond to a respective signal transmitted by the satellite terminal during a clear-sky condition.

12. The system of claim 8, wherein the system estimates the path loss based on only the plurality of second signal quality indicators that are received regardless of a clear-sky condition.

13. A method for use by a satellite terminal to compensate for noise and interference in a Kurz above Ka band satellite system, the method comprising:
for each respective frequency of a plurality of frequencies, performing:
periodically transmitting, during a ranging process, a signal over a respective frequency of the plurality of frequencies from a satellite terminal once every time interval, the time interval being at least twenty-four hours,
receiving, at the satellite terminal from a satellite gateway, a respective signal quality indicator corresponding to the signal transmitted over the respective frequency,
determining a power control error for the respective frequency based on a difference between the respective signal quality indicator and a signal quality target,
adjusting a transmit power on the respective frequency at the satellite terminal based on the determined power control error for the respective frequency,
performing, while the power control error for the respective frequency is greater than a predetermined tolerance of zero:
retransmitting, on the respective frequency, the signal at the adjusted transmit power,
receiving, at the satellite terminal from satellite gateway, a new respective signal quality indicator corresponding to the signal retransmitted over the respective frequency,
determining a new power control error for the respective frequency based on a difference between the new respective signal quality indicator and the signal quality target, and
adjusting the transmit power on the respective frequency at the satellite terminal based on the determined new power control error for the respective frequency;
storing a value representing the adjusted transmit power as a ranged power setting at the respective frequency in a vector of ranged power settings for the plurality of frequencies;
applying a latest determined power control error for the respective frequency to a long-term filter associated with the respective frequency, an output of the long-term filter associated with the respective frequency being an estimate of noise and interference for the respective frequency.

14. The method of claim 13, wherein the periodically ranging over a plurality of frequencies further comprises:
transmitting an Aloha signal on each of the plurality of frequencies initially at a maximum power level.

15. The method of claim 13, further comprising:
determining whether a clear sky condition exists; and
performing the steps of claim 13 only when the clear sky condition is determined to exist.

16. The method of claim 13, further comprising:
transmitting a second signal, from the satellite terminal, on any one of the plurality of frequencies while not performing the ranging process;
receiving a second signal quality indicator, from the satellite gateway, in response to the transmitting a second signal;
determining a second power control error based on a difference between the second signal quality indicator and the signal quality target;
applying the second power control error to a system tracking filter, common to the plurality of frequencies, an output of the system tracking filter being an estimated path loss, wherein
the transmit power on each of the plurality of frequencies at the satellite terminal is based on the estimated noise and interference for each of the plurality of frequencies and the estimated path loss.

17. The method of claim 16, wherein
the applying of the second power control error to a system tracking filter is performed regardless of a clear sky condition.

18. The method of claim 13, further comprising:
sending, upon completion of the ranging process, the vector of ranged power settings for each of the plurality of frequencies to a satellite gateway;
receiving an averaged normalized vector of final ranged power settings, the averaged normalized vector being based on vectors of ranged power settings from a plurality of satellite terminals; and
updating the vector of ranged power settings of the satellite terminal based on the received averaged normalized vector of ranged power settings.

* * * * *